Dec. 24, 1946.　　　R. I. N. WEINGART　　　2,413,203
MECHANICAL MOVEMENT
Filed Dec. 13, 1944　　　2 Sheets-Sheet 1

INVENTOR
Richard I. N. Weingart
BY John P. Chandler
his ATTORNEY

Dec. 24, 1946.   R. I. N. WEINGART   2,413,203
MECHANICAL MOVEMENT
Filed Dec. 13, 1944   2 Sheets-Sheet 2
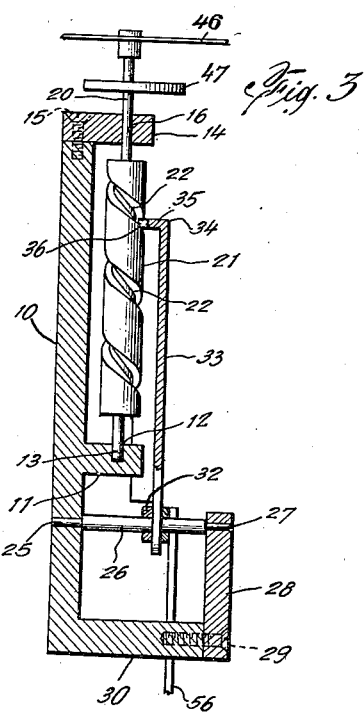
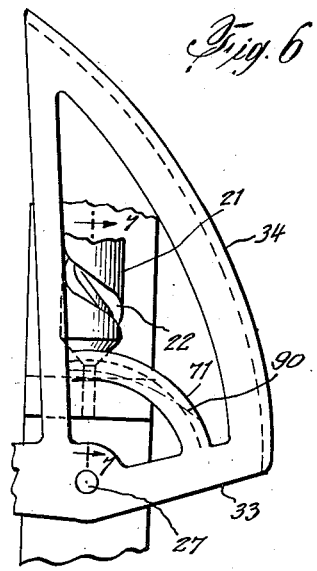
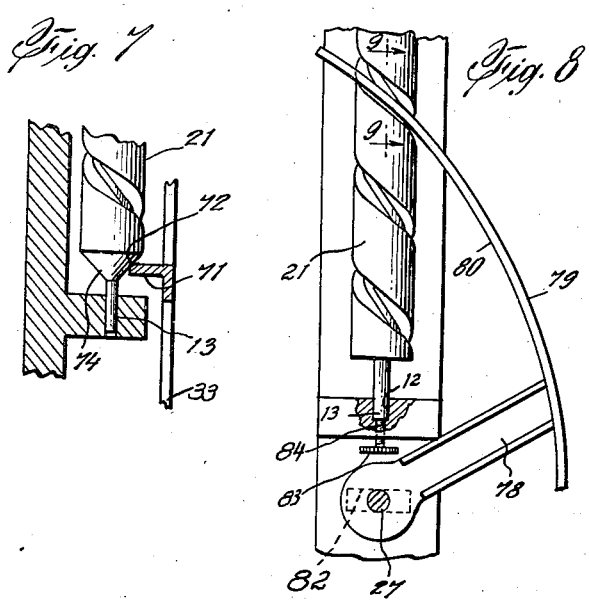
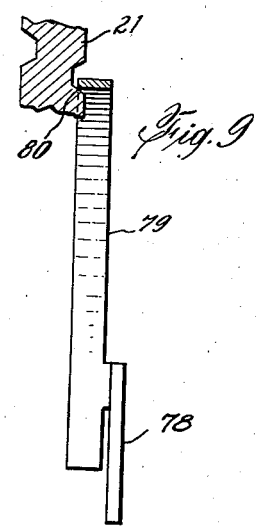
INVENTOR
Richard I. N. Weingart
BY John P. Chandler
his ATTORNEY Patented Dec. 24, 1946

2,413,203

UNITED STATES PATENT OFFICE 2,413,203

MECHANICAL MOVEMENT

Richard I. N. Weingart, Glen Head, N. Y.

Application December 13, 1944, Serial No. 568,007

14 Claims. (Cl. 74—89)

This invention relates to an improved movement for translating straight-line or substantially straight-line reciprocating movement or oscillating movement to or from alternating rotary movement in a plane disposed generally at right angles to the path of the reciprocating movement. The movement of the present invention has special application to the measuring instrument art, particularly pressure-responsive devices, although it has other applications as well.

One of the principal objects of the present invention is to provide a movement of this general character which accurately translates reciprocating movement into alternating rotary movement, wherein the latter may be multiplied to any reasonable factor.

Another important object of the present invention is to provide a movement of the character described wherein movement of the driving member over a portion of its stroke translates proportionate movement, multiplied or otherwise, to the driven member, and wherein movement of the driving member over other portions of its stroke produces movement in the driven member, either greater or less than that of the first-mentioned portion of the stroke.

In certain instruments for measuring pressures, it is desirable to obtain a larger dial reading for pressure variations within certain limits than in others. For instance, in air-speed indicators for aircraft, the pressure increases as the square of the speed, and it has accordingly been necessary to retard movement of the driven element or pointer shaft by the use of springs or other means. By appropriately forming the driving member of the present invention, a uniform dial reading for each increase in unit of speed will be achieved without resorting to artificial retarding devices which produce errors, as is well known.

The movement of the present invention consists essentially of a driven member which may be formed on, or associated with, the pointer shaft in the case of a measuring instrument, and which comprises a generally cylindrical member having a helical recess or helical thread. The driving member is essentially a cam which communicates motion to the driven member by action of its edges, which are usually curved. The cam is mounted preferably adjacent to one terminal of the driven member for pivotal movement, the cam being movable in a plane parallel with the axis of the driven member, and being provided with a driving edge which contacts one face of the helical member to drive such helical member in one direction, opposite rotation being effected by means of a hair spring, or otherwise, which causes rotation as such rotation is permitted through opposite non-driving movement of the cam. By appropriately forming the edge of the cam, any increase or decrease in speed of rotation of the driven member may be effected. A link may connect the responsive element with the pivoted cam, the distance between the point of pivotal connection between the link and the cam, and the axis of the cam, determining the speed of rotation of the cam. Thus, by varying this distance toward or away from the cam axis, the speed of rotation will be increased or decreased, respectively, for purposes of calibration.

The driving edge of the cam may comprise a plane curve with an increasing radius vector. A cam formed with a driving edge of proper contour gives proportionate movement in the driving and driven members throughout their range. If the factors of increase in radius vector of the cam and lead angle of the helix are properly chosen, there results substantially a rolling action between the driving and driven members, which is desirable, though not essential, in an instrument movement of this character. If it is desired to have proportionate driven movement over a portion of the range of cam movement, and increased or decreased movement over other portions of the range, the driving edge will be modified appropriately, but the rolling action is reduced and a measure of slippage occurs. As the driving edge approaches a contour wherein it is normal to the circle, the speed of rotation of the driven helical member is proportionately decreased, and, in some instances, it may be desired to impart zero rotation to the driven helical member over a portion of the range, which is accomplished by forming that portion of the driving edge of the cam as the arc of a circle whose center is the axis of the cam. The driving edge of the cam imparts a thrust against the face of the driven helical member which has a plurality of components, one of which is in a plane at right angles to the axis of the helical member. The other component is parallel with such axis, and accordingly produces end thrust which may be taken up by the usual thrust bearing. The points at which the driving edge of the cam contacts the face of the helical member constitute what may be termed the pitch line, and in the movement of the present invention this pitch line may be equi-distant at all points from its axis, even though the contour of the driving edge be varied.

Another important object of the present invention is to provide improved means associated with the cam for taking up end thrust when the cam has substantially the contour to produce proportionate rotation between the driving and driven members. Such means comprise a second face associated with the cam, such face being the arc of a circle whose center is the axis of the cam. This edge contacts an annular portion or flange associated with the driven spiral member. Accordingly, as the driving edge of the cam produces rotation of the driven spiral member, the end thrust is taken up by the contact between the second cam face and the annular flange, the latter contact having a rolling action. The use of the thrust-receiving element just described is not, of course, limited to instances wherein the rotation between the driving and driven members is proportionate.

Since movement of the helical member is imparted through alternating rotary movement in the cam, it may be more proper to define the movement of the present invention as one to translate alternating rotary movement to alternating rotary movement. This is true whether the helical member is the driven or driving member, and in the latter case the spring or other opposite driving means may be associated with the cam. In the case of the diaphragm gauge forming one embodiment of the present invention, the starting movement is, essentially speaking, reciprocating.

It will be apparent from the foregoing that by appropriately forming the driving cam and/or the driven helical member, the movement may produce uniform movement in the driven member from non-uniform movement in the driving member, or vice versa, or combinations of both. Thus, the movement of the present invention is highly flexible, and one of its points of novelty is due to the fact that the single, continuous driving cam may be so formed as to produce rotation in the driven member of more than 360°.

Another important object of the present invention is to provide a movement wherein the gear ratio can be increased as a result of the depth of the movement, rather than by the increase of the width of the movement, as is the case in conventional spur gearing. This is of great importance in aviation instruments where there is a limited instrument panel space with ample depth behind the instrument panel.

In the drawings:

Fig. 3 is a section taken on line 3—3 of Fig. 1.

Fig. 6 is a front elevation of a modified form of movement which incorporates a special type of thrust-receiving element in the driving member.

Fig. 7 is a broken section taken on line 7—7 of Fig. 6.

Fig. 8 is a front elevation of a modified form of movement wherein the driving edge of the cam is deformable and variable.

Fig. 9 is a broken section taken on line 9—9 of Fig. 8.

Figure 1:
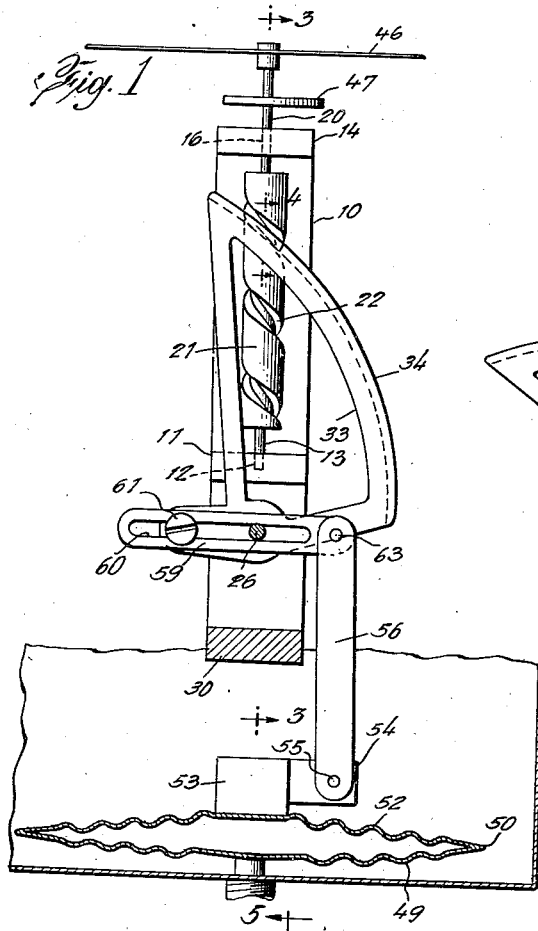
Fig. 1 is a broken section taken through a pressure-responsive device, the view showing a front elevation of the movement constituting one embodiment of the present invention.

The movement of the present invention may comprise a frame 10, shown in some detail in Fig. 3, the frame having an intermediate extension 11 formed with an aperture 12 providing a thrust bearing for one terminal 13 of the pointer shaft. A plate 14 secured at the upper end of the frame, as by screws 15, is provided with an aperture 16 which receives the opposite terminal 20 of the pointer shaft. 21 is a helical member which may, if desired, be formed integrally with the pointer shaft, or it may be formed as a separate element which is drilled with a longitudinal bore to receive the pointer shaft. It is formed with a helical recess 22. The frame is further provided with a bore 25 which receives one end of cam shaft 26, the other end of the shaft being journalled in a bore 27 in a plate 28 secured, as by screws 29, to a lower extension 30 of the frame. A bushing 32 carried by the cam shaft supports the cam 33, the outer edge of which may be curved, as shown at 34, which edge is inwardly turned to form driving portion 35 having driving edge 36.

It will be seen that counter-clockwise rotation of the cam, when viewed from the right in Fig. 3, produces clockwise rotation of the pointer shaft, when viewed from the front of the instrument. The pointer shaft carries pointer 46. Opposite rotation of the pointer shaft is produced by hair spring 47, as such opposite rotation is permitted through opposite rotation of the cam. The free end of the hair spring may be appropriately secured to the frame.

Figure 2:
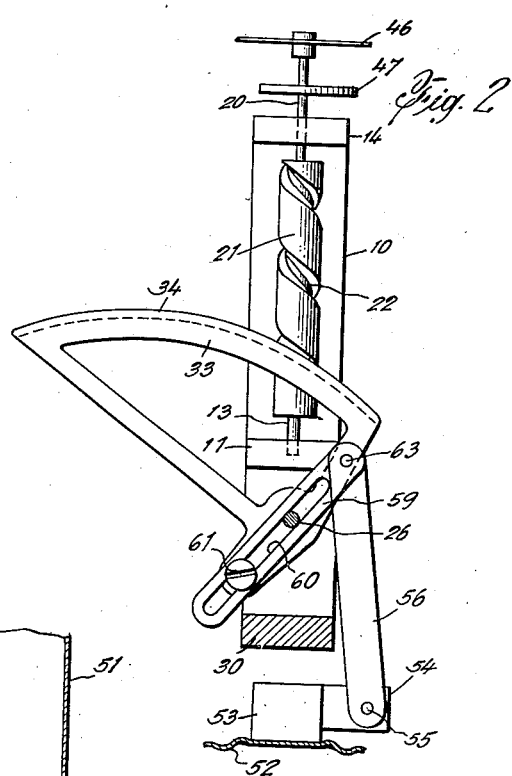
Fig. 2 is similar to Fig. 1, but shows the relation of the parts of the movement after the driven member has been rotated by the driving element.
Figure 4:
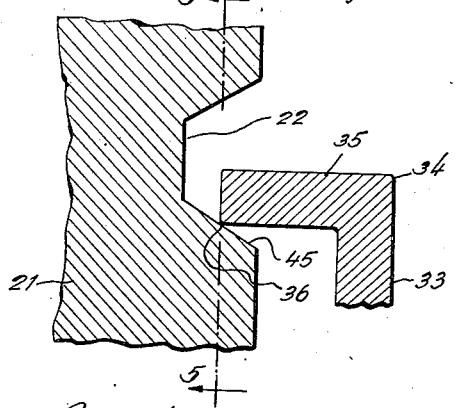
Fig. 4 is an enlarged section taken on line 4—4 of Fig. 1.

The movement of Figs. 1 and 2 is illustrated in connection with a diaphragm-type of pressure gauge wherein diaphragm unit 50, illustrated as comprising a capsule having opposed diaphragms 49 and 52, is suitably mounted within a housing 51. Upper diaphragm 52 carries a post 53 formed with a transverse extension 54 which is connected at 55 to a link 56. A link 59 having a slot 60 is secured by screw 61 to the lower end of the cam, shaft 26 likewise passing through the slot. At the opposite end, link 59 is pivotally connected at 63 to the upper end of link 56. Thus, the relative distance between the pivotal connection between link 56 and the axis of the cam shaft may be adjusted by adjusting the position of link 59.

Figure 5:
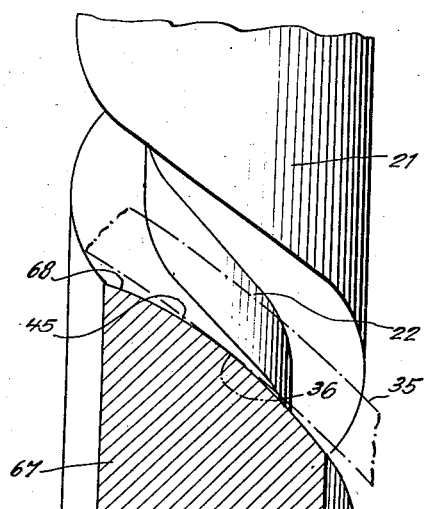
Fig. 5 is a section taken on line 5—5 of Fig. 4.

Depending upon the use to which the movement is put, the lead angle of the helical member may be varied within limits, just as the contour of the driving edge of the cam may be varied. In order to avoid jamming or binding between the cam and the face of the helical recess, the contour of the cam should be so formed relative to the face of the helical groove as to provide a substantially point contact between the two elements, and to leave an adequate space on each side of such point of contact. This relationship is illustrated generally in Fig. 5, wherein the portion 67 in section is in a plane parallel with the axis of the helical member. Such a section produces a convex curved edge 68 at the point of intersection between this section and the recess. The point of contact 36 between the driving edge 35 of the cam, and the face of the helical recess, is illustrated as being in the center of this convexly-curved edge 68, and it will be noted that there is a measure of clearance between the edge of the cam and the face of the recess on each side of such point of contact. This point of contact need not necessarily be precisely in the center, and in many cases it may actually shift from side to side during movement of the cam. In the event that the contour of the driving edge of the cam approaches too nearly an arc of a circle whose center is the axis of the driving cam, binding will result, and likewise, if the radius vector of the driving edge of the cam increases too rapidly, the opposite face of the driving edge will contact the opposite face of the helical recess with similarly bad results.

In the modified form of the invention illustrated in Figs. 6 and 7, the cam plate 33 is carried, as before, on shaft 27, and is provided with the same curved edge 34, which curved edge contacts one face of recess 22 in helical member 21. In this instance, however, instead of opposing the thrust of the helical member in a direction parallel to its axis by providing the thrust-bearing structure of Fig. 3, the following means are provided. Cam plate 33 has a portion 71 which, for convenience, may be termed a gear having a curved edge 72 comprising the arc of a circle whose center is the axis of the cam plate. This edge 72 of gear 71 contacts a conical element 74 carried adjacent one end of the helical member. Conical element 74 may, if desired, be formed integrally with shaft terminal 13 and helical member 21. In actual practice, however, it is preferred to form element 74 separately, drill it to a size where it snugly fits shaft terminal 13, and then force-fit the element on such shaft terminal. If driving edge 36 of the cam plate is formed as hereinbefore described, there then results substantial rolling action between edge 72 of gear 71 and conical element 74. Even in instances wherein driving edge 36 is not so formed, the thrust element shown in Figs. 6 and 7 gives good results.

In the modification of Figs. 8 and 9, the driven element is similar to that shown in Figs. 1 to 3, inclusive, but in this instance the driving element comprises a member 78 carried on shaft 27, such member having a curved extension 79 which provides a driving edge 80 that contacts one face of the helical recess. By forming the member of sheet metal, it will be appreciated that the driving edge 80 may be appropriately varied so as to impart increased or decreased movement to the driven member for proportionate rotation of the cam. In certain instances, the driving edge of the cam may be straight over a portion or all of its length, and in such latter case the driving edge may nevertheless be properly said to have a constantly-increasing radius vector, as referred to in the appended claims. This constant increase may be either uniform or non-uniform, as will be appreciated, and this is true whether the edge is straight or curved.

For the purpose of resetting the pointer to zero, a screw 83 having a knurled head is positioned in a threaded aperture 84 which is aligned with aperture 12 which receives shaft terminal 13. Thus, the forward end of the screw 83 abuts against the end wall of the shaft terminal 13 and forms the thrust-bearing element. When the condition-responsive means are neutral, and accordingly cam 79 is at rest, rotation will be imparted to the driven member 21 by turning the screw 83 in one direction or the other.

Fig. 8 illustrates a further modification in the structure wherein the position of cam shaft 27 may be adjusted transversely of the axis of the driven helical member. That is to say, in the previous embodiments of the invention, the axis of the cam shaft is aligned with, but lies at right angles to, the axis of the helical member. By providing a slot 82 in the frame for the reception of a bearing (not shown) for the shaft, the bearing may be moved in either direction from the position shown, which may be a further aid in calibration of the movement.

The helical driven member has been illustrated in the drawings as having a substantially constant lead angle, although it will be appreciated that if this lead is varied within appropriate limits, uniform movement in the driving member will produce a non-uniform movement in the driven member, and vice versa. Likewise, if the contour of the driving cam is varied in the manner just described, uniform movement in the driving member may produce non-uniform movement in the driven member, and vice versa, and the respective movements may be uniform or non-uniform over a portion of the driving range, all to the end of meeting special requirements.

Another modification is illustrated in Fig. 6, wherein broken line 90 indicates a varied contour in the cam 71, which has previously been described as being the arc of a circle whose center is at the axis of the driving cam. By varying this contour in the manner indicated by broken line 90, rotation of the cam produces longitudinal movement of the driven helical member, thereby influencing rotation thereof by virtue of such longitudinal movement.

While three forms or embodiments of the invention have been shown and described herein for illustrative purposes, and the construction and arrangement incidental to three specific applications thereof have been disclosed and discussed in detail, it is to be understood that the invention is limited either to the mere details or relative arrangement of parts, nor to its specific embodiments shown herein, but that extensive deviations from the illustrated forms or embodiments of the invention may be made without departing from the principles thereof.

What I claim is:

1. A movement for translating alternating rotary movement into alternating rotary movement, the movement including a driving member consisting of a pivoted cam formed with one continuous driving edge having an increasing radius vector, a driven member comprising a pivoted helical member whose axis lies generally parallel with the plane of rotation of the cam, the cam exerting a thrust against a face of the helical member, producing rotation thereof in one direction, and means for producing opposite rotation of the helical member as such opposite rotation is permitted through non-driving rotation of the cam.

2. A movement for translating reciprocating movement into alternating rotary movement, the movement including a driving member consisting of a pivoted cam formed with one continuous driving edge having an increasing radius vector, a driven member comprising a pivoted helical member whose axis lies generally parallel with the plane of rotation of the cam, the cam exerting a thrust against a face of the helical member, producing rotation thereof in one direction, spring means for producing opposite rotation of the helical member as such opposite rotation is permitted through non-driving rotation of the cam, and means connecting the source of reciprocating movement with the pivoted cam.

3. A movement for translating reciprocating movement into alternating rotary movement, the movement including a driving member consisting of a pivoted cam formed with a driving edge constituting a plane curve having an increasing radius vector, a driven member comprising a pivoted helical member whose axis lies generally parallel with the plane of rotation of the driving edge of the cam, the helical member being of generally cylindrical shape and having a helical recess of generally uniform lead angle, the driving edge of the cam exerting a thrust against a face of the helical recess, producing rotation thereof in one direction, and means for producing opposite rotation of the helical member as such opposite rotation is permitted through non-driving rotation of the cam.

4. A movement for translating reciprocating movement into alternating rotary movement, the movement including a driving member consisting of a pivoted cam formed with a driving edge constituting a plane curve with an increasing radius vector, a driven member comprising a pivoted helical member whose axis lies generally parallel with the plane of rotation of the cam, the cam exerting a thrust against a face of the helical member, producing rotation thereof in one direction, means for producing opposite rotation of the helical member as such opposite rotation is permitted through non-driving rotation of the cam, and means for opposing thrust of the helical member longitudinally of its axis, such means comprising a thrust element carried by the cam and formed with a curved edge which is concentric with the cam axis, and an annular element associated with one end of the helical member which is contacted by the thrust element.

5. A movement for translating alternating rotary movement into alternating rotary movement, the movement including a driving member consisting of a single pivoted cam formed with a driving edge constituting a plane curve with an increasing radius vector, a driven member comprising a pivoted helical member whose axis lies generally parallel with the plane of rotation of the cam, the cam exerting a thrust against a face of the helical member, producing rotation thereof in one direction, and means for producing opposite rotation of the helical member as such opposite rotation is permitted through non-driving rotation of the cam, one portion of the driving edge of the cam having a lesser increase in radius vector than another portion, the former portion transmitting less rotation to the driven member than the latter portion during proportionate movement of the driving element.

6. A movement for translating alternating rotary movement into alternating rotary movement, the movement including a driving member comprising a pivoted cam formed with a driving edge constituting a plane curve of variable contour but with a generally increasing radius vector, a driven member comprising a pivoted helical member whose axis lies generally parallel with the plane of rotation of the cam, the cam exerting a thrust against a face of the helical member, producing rotation thereof in one direction, and means for producing opposite rotation of the helical member as such opposite rotation is permitted through non-driving rotation of the cam, the driving edge of the cam being formed of bendable material in order to permit the contour to be varied, thus producing increased or decreased rotation in the driven member for proportionate rotation of the driving member.

7. A movement for translating alternating rotary movement to alternating rotary movement, and including a frame, a driving member pivoted in the frame and comprising a cam formed with a driving edge having a non-uniformly increasing radius vector, a driven member also pivoted in the frame and comprising a helical member whose axis is generally at right angles to the axis of the cam, the driving edge of the cam imparting a thrust to the face of the helical member, one component of the thrust being in a plane at right angles to the axis of the helical member, producing rotation thereof, and another component of the thrust being parallel with such axis, means for opposing the latter thrust comprising a curved member associated with the cam, the curve being concentric with the cam axis, an annular thrust-transmitting element carried adjacent one end of the helical member contacting the member, the driving edge of the cam causing rotation of the helical member in one direction, and means for producing opposite rotation as such opposite rotation is permitted through opposite, non-driving rotation of the cam.

8. A movement for a measuring instrument having movable means responsive to changes in conditions, such movement including a frame, a driving member pivoted in the frame and comprising a cam formed with a single continuous driving edge constituting a plane curve with a constantly increasing radius vector, a driven member also pivoted in the frame and comprising a helical member whose axis is generally at right angles to the axis of the cam, the driving edge of the cam imparting a thrust to a face of the helical member, producing rotation thereof in one direction, means for producing opposite rotation as such opposite rotation is permitted through opposite, non-driving rotation of the cam, and a link connecting the condition-responsive element with the cam.

9. A movement for translating alternating rotary movement into alternating rotary movement, the movement including a driving member comprising a pivoted cam formed with a driving edge constituting a plane curve with an increasing radius vector, a driven member comprising a pivoted helical member whose axis lies generally parallel with the plane of rotation of the cam, the cam exerting a thrust against a face of the helical member, producing rotation thereof in one direction, and means for producing opposite rotation of the helical member as such opposite rotation is permitted through non-driving rotation of the cam, the driving edge of the cam being bendable in order to permit adjustment of the movement to cause greater or lesser movement in the driven member for proportionate movement in the driving member.

10. A movement for translating alternating rotary movement into alternating rotary movement, the movement including a frame, a driving member journalled in the frame and comprising a pivoted cam formed with a driving edge having a constantly increasing radius vector, a driven member comprising a helical member journalled in the frame, the axis of the helical member lying generally parallel with the plane of rotation of the cam, the cam exerting a thrust against a face of the helical member, producing rotation thereof in one direction, means for producing opposite rotation of the helical member as such opposite rotation is permitted through non-driving rotation of the cam, and means for imparting rotation to the helical member independently of the cam, such means comprising a thrust-bearing element mounted axially with respect to the helical member and contacting such helical member, the thrust-bearing element being adjustable longitudinally of the axis of the helical member.

11. A movement for translating alternating rotary movement into alternating rotary movement, said movement including a frame, a driving member journalled in the frame and comprising a pivoted cam formed with a driving edge having a constantly increasing radius vector, a driven member journalled in the frame comprising a helical member whose axis lies generally parallel with the plane of rotation of the cam, the cam exerting a thrust against the face of the helical member, producing rotation thereof in one direction, means for producing opposite rotation of the helical member as such opposite rotation is permitted through non-driving rotation of the cam, and means for adjusting the position of the axis of the cam to positions parallel with such axis.

12. A movement for translating alternating rotary movement into alternating rotary movement, the movement including a driving member comprising a pivoted cam formed with a driving edge having an increasing radius vector, a driven member comprising a pivoted helical member whose axis lies generally parallel with the plane of rotation of the cam, the cam exerting a thrust against a face of the helical member, producing rotation thereof in one direction, and means for producing opposite rotation of the helical member as such opposite rotation is permitted through non-driving rotation of the cam, the driving edge of the pivoted cam being bendable so as to produce non-uniform movement in the driven member from uniform movement in the driving member through all or a portion of the driving range of such driving member, or to produce uniform movement in the driven member from non-uniform movement in the driving member through all or a portion of the driving range of said driven member.

13. A movement for translating alternating rotary movement into alternating rotary movement, the movement including a driving member comprising a pivoted cam formed with a driving edge having an increasing radius vector, a driven member comprising a pivoted helical member whose axis lies generally parallel with the plane of rotation of the cam, the cam exerting a thrust against a face of the helical member, producing rotation thereof in one direction, and means for producing opposite rotation of the helical member as such opposite rotation is permitted through non-driving rotation of the cam, the helical member being formed with a non-uniform lead.

14. A movement for translating alternating rotary movement into alternating rotary movement, the movement including a frame, a driving member journalled in the frame and comprising a pivoted cam formed with a driving edge having an increasing radius vector, a driven member comprising a helical member journalled in the frame, the axis of the helical member lying generally parallel with the plane of rotation of the cam, the cam exerting a thrust against the face of the helical member, producing rotation thereof in one direction, means for producing opposite rotation of the helical member as such opposite rotation is permitted through non-driving rotation of the cam, and means for limiting movement of the helical driven member longitudinally of its axis due to the thrust produced by the cam longitudinally of such axis, such means comprising an annular thrust element carried by the helical member, and a second driving edge associated with the cam and contacting such annular thrust element, such second driving edge being non-uniform relative to a circle whose center is the axis of the driving cam.

RICHARD I. N. WEINGART.